US005646781A

United States Patent [19]
Johnson, Jr.

[11] Patent Number: 5,646,781
[45] Date of Patent: Jul. 8, 1997

[54] OPTICAL FILTERS FOR FORMING ENHANCED IMAGES

[75] Inventor: Robert L. Johnson, Jr., West Brattleboro, Vt.

[73] Assignee: Omega Optical, Inc., Brattleboro, Vt.

[21] Appl. No.: 441,624

[22] Filed: May 15, 1995

[51] Int. Cl.$^6$ .................. G02B 5/28; G02B 5/22
[52] U.S. Cl. ............. 359/589; 359/588; 359/590
[58] Field of Search .................. 359/580, 586, 359/588, 589, 590, 359, 360

[56] References Cited

U.S. PATENT DOCUMENTS

| | | |
|---|---|---|
| 3,877,797 | 4/1975 | Thornton, Jr. . |
| 4,542,959 | 9/1985 | Kreutzig . |
| 4,659,178 | 4/1987 | Kyogoku ................. 359/590 |
| 4,786,148 | 11/1988 | Sekimura et al. . |
| 4,819,077 | 4/1989 | Kikuchi et al. . |
| 4,826,286 | 5/1989 | Thornton, Jr. . |
| 4,933,110 | 6/1990 | Tucker . |
| 4,935,166 | 6/1990 | Lee et al. . |
| 4,997,241 | 3/1991 | Muratomi ................. 359/589 |
| 5,173,808 | 12/1992 | Auer et al. . |
| 5,179,468 | 1/1993 | Casloli ..................... 359/588 |
| 5,198,927 | 3/1993 | Rathbone et al. . |
| 5,233,464 | 8/1993 | Costich ..................... 359/589 |
| 5,296,961 | 3/1994 | Trost et al. ............... 359/590 |

OTHER PUBLICATIONS

H.K. Pulker, *Coatings of Glass*, Thin Films Science and Technology, Basic Research Laboratory, Balzers AG, Liechtenstein.

*Primary Examiner*—Jon W. Henry
*Attorney, Agent, or Firm*—Wolf, Greenfield & Sacks

[57] ABSTRACT

An optical filter for providing an enhanced image. The filter may comprise at least one substrate, layers of a low refractive index material and layers of a high refractive index material. The layers are stacked so that the filter blocks passbands at 490 nm and 590 nm as well as other image-confusing radiation. Light which is transmitted by the filter provides an enhanced image for viewing by the human eye as well as nonhuman detectors.

21 Claims, 6 Drawing Sheets

OPTICAL FILTERS FOR FORMING ENHANCED IMAGES

BACKGROUND

1. Field of the Invention

The present invention relates generally to optical filters and more specifically to optical filters designed to enhance image formation.

2. Discussion of the Related Art

Most sources of light include wavelengths of radiation which are confusing to color image formation. This confusion is often caused by the tendency for the primary color sensors to be stimulated by wavelengths of radiation other than the primary colors of light. In many cases, it is desirable to remove the image-confusing radiation so that an enhanced image is obtained. Such instances include, for example, the illuminations in art galleries, operating rooms and consumer product displays as well as viewing with eyeglasses and goggles. For these applications, the image is typically detected by the human eye. However, it may also be beneficial to have a better quality image formed for other systems which include, for example, remote monitoring using cameras, high definition cameras, film, light amplifying picture tubes (vidicons), charge coupled devices (CCD's), and silicon intensified detectors (SID's).

To achieve an enhanced image, it is usually necessary to the manipulate electromagnetic radiation emitted by the light source with an optical filter. Currently existing optical filters include those disclosed in U.S. Pat. Nos. 3,877,797 and 4,826,286 to Thornton, Jr. and U.S. Pat. No. 5,173,808 to Auer, et al.

SUMMARY

The present invention provides optical filters that, by creating standing waves within trammissive materials, are capable of forming reflection and transmission regions that enhance images. Typically, only three passbands are produced by attenuating undesirable light at other image-confusing wavelengths. The passbands include the primary colors of the spectrum and are centered at about 450 nm, 530 nm and 650 nm. Thus, narrow reflectance bands exist concurrently at the wavelengths of cyan (490 nm), and yellow (590 nm) light. In addition, electromagnetic radiation at the wavelengths corresponding to portions of the ultraviolet (<410 nm) and the infrared (>700 nm) are filtered. In a preferred embodiment of the invention, these passbands are created using an optical filter having a substrate and a multilayer coating placed on the substrate. The substrate includes at least one substantially transparent material. The multilayer coating comprises at least one layer of a high refractive index material and at least one layer of a low refractive index material. The materials used for the layers and the arrangement of the layers are selected so that the optical filter blocks a substantial portion of the undesirable wavelengths of electromagnetic radiation which impinge upon the optical filter, transmits a relatively substantial portion of the desirable wavelengths of light through the filter and forms an enhanced image.

Preferably, the layers of materials are stacked adjacent to each other with layers of high refractive index material alternating with layers of low refractive index material. The total optical thickness of the filter is less than that of most prior art filters, allowing transmission of greater portion of the desirable wavelengths of light through the filter. The total phase thickness for each pair of layers of high and low refractive index preferably ranges from about 720° to about 900°.

In one embodiment of the present invention the optical filter has two substrates and a multilayer coating disposed between the substrates. The substrates each include at least one substantially transparent material.

In a preferred embodiment, the optical thickness of the layer formed of a high refractive index material is greater than the optical thickness of the layer formed of the low refractive index material. Typically, the optical thickness of the high refractive index layer is at least two times the optical thickness of the low refractive index material and may be nine times the optical thickness of the low refractive index layer.

The present invention also comprises optical systems including at least one light source, at least one optical filter according to the present invention and at least one detector. The optical filter is disposed in relation to the source and the detector to block a substantial portion of any undesirable electromagnetic radiation emitted by the source and transmit a relatively substantial portion of the desirable wavelengths of light emitted by the source so that an enhanced image is formed as detected by the detector. The detector includes the human eye, and other detectors such as set forth above.

BRIEF DESCRIPTION OF THE DRAWINGS

The objects, advantages and features of the present invention will be more clearly appreciated from the following detailed description when taken in conjunction with the accompanying drawings, in which.

DETAILED DESCRIPTION

Figure 1:
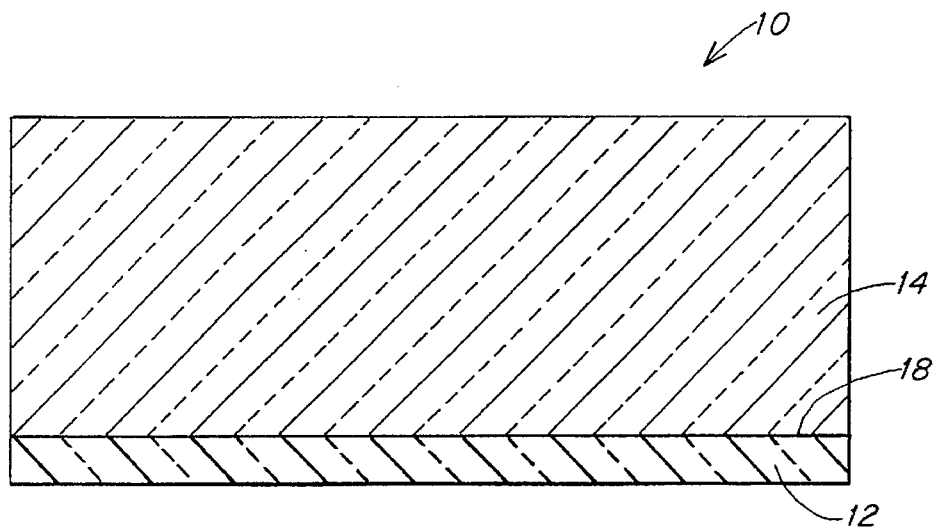
FIG. 1 is a cross-sectional view of an optical filter having one substrate according to the present invention.
Figure 3:
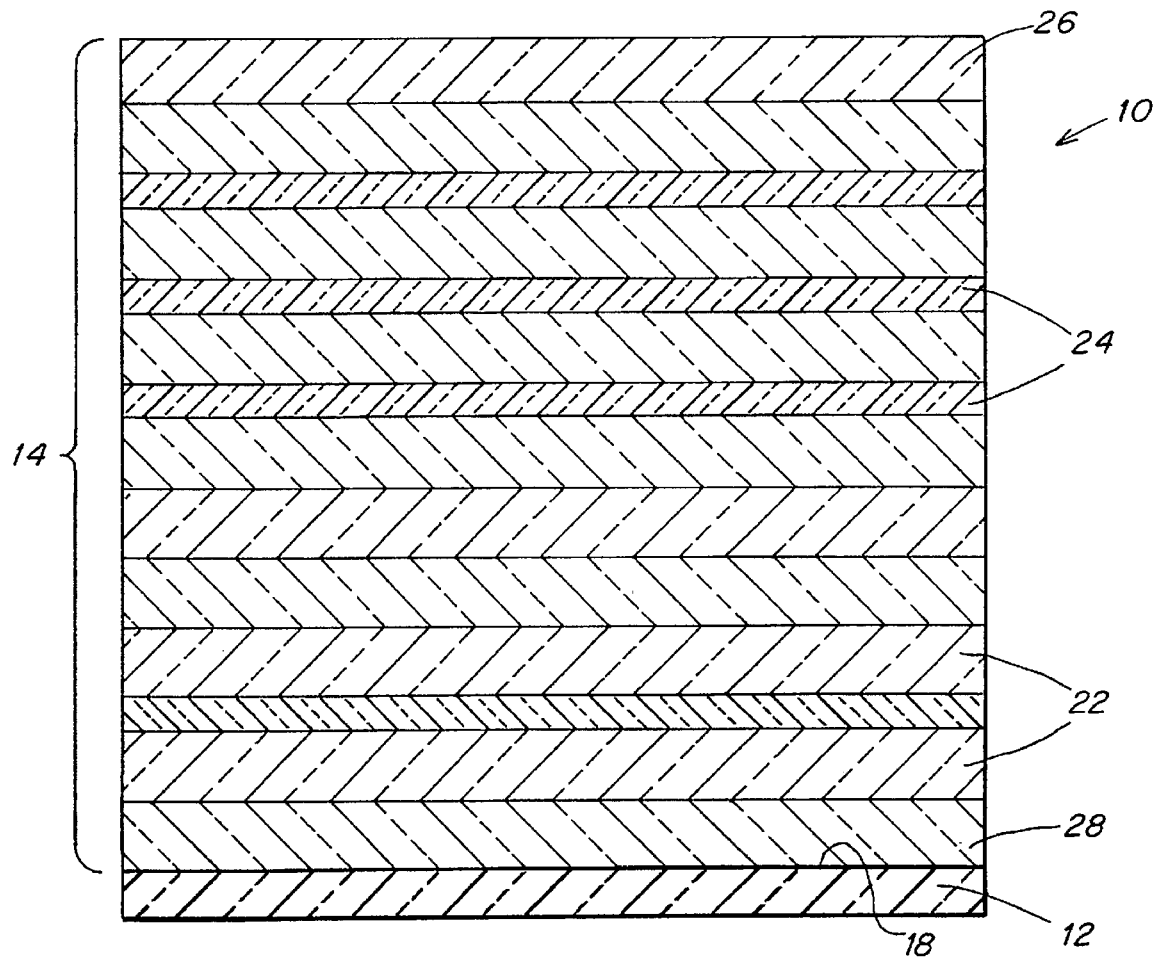
FIG. 3 is a cross-sectional view of another embodiment of the optical filter of FIG. 1.
Figure 4:
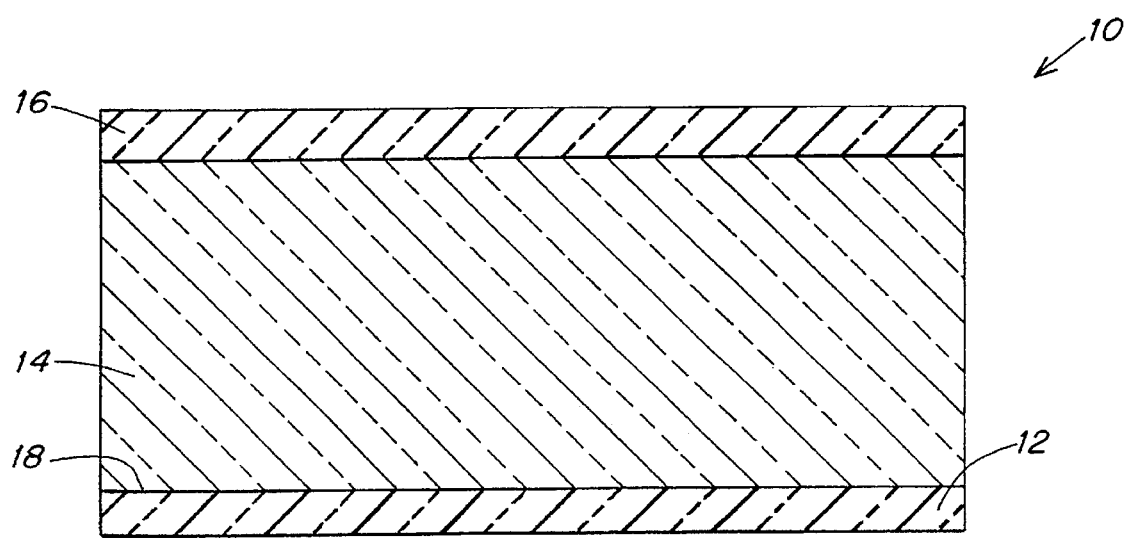
FIG. 4 is a cross-sectional view of an optical filter having two substrates according to the present invention.
Figure 5:
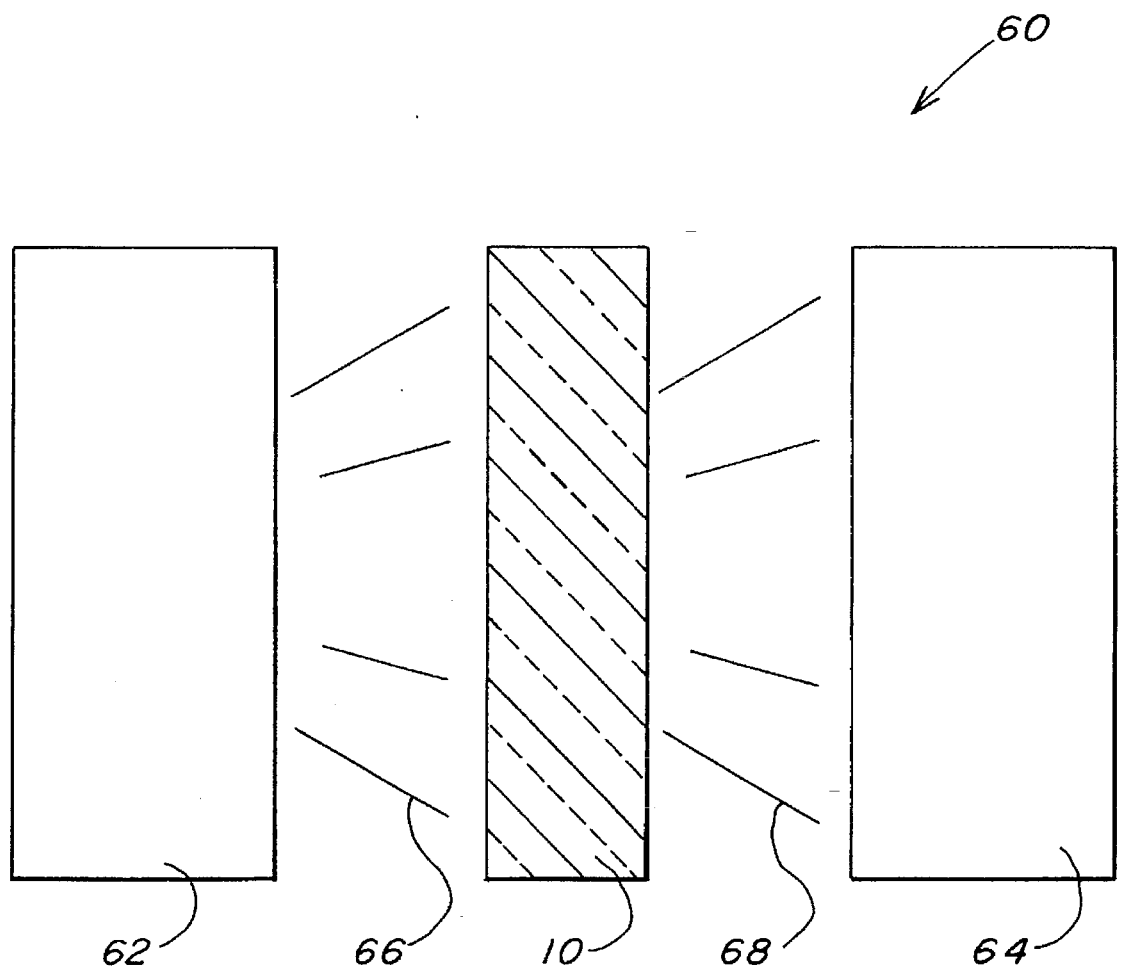
FIG. 5 is a system including a source, an optical filter and a detector according to the present invention.

The present invention relates to optical filters as shown in FIGS. 1–4 and systems which employ such optical filters as shown in FIG. 5. FIG. 1 depicts an optical filter 10 which includes a substrate 12 and a multilayer coating 14 disposed on a top surface 18 of substrate 12. Optical filter 10 is designed to selectively filter undesired wavelengths of electromagnetic radiation while transmitting desired wavelengths to yield an enhanced image.

Fabry-Perot theory teaches that two reflective materials become anti-reflective with respect to a particular wavelength of electromagnetic radiation when the two reflective materials are separated from each other by an integral number of half the wavelength of the electromagnetic radiation. The present invention takes advantage of this theory and further implements the fact that standing waves may be created within certain materials when the materials are appropriately placed with respect to one another. The materials may be manipulated to create any number of standing waves. Since the wavelengths of radiation which form standing waves are not transmitted by the materials, an optical filter in accordance with the present invention may be produced by layering such materials so that any undesirable wavelengths of light are not transmitted by the optical filter.

"Enhanced image" as used herein denotes an image having a signal to noise ratio of at least 1 and a transmitted signal at the desired wavelengths of at least about 50%. "Signal to noise ratio" is herein meant to refer to the ratio of the signal of the desired wavelengths of light to the signal at undesired wavelengths of electromagnetic radiation. "Undesired wavelengths of electromagnetic radiation" as used herein denote wavelengths of electromagnetic radiation which are confusing to image formation. Such wavelengths of electromagnetic radiation include infrared radiation and ultraviolet radiation which would be detected in the absence of optical filter 10 as well as cyan wavelengths of light and yellow wavelengths of light. Typically, these regions of the spectrum have wavelengths of less than 410 nm, greater than 700 nm, approximately 490 nm and approximately 590 nm, respectively. The cyan and yellow light typically include very narrow bands of about 10 to 20 nm in width. "Desired wavelengths of light" herein designate passbands of light which enhance image formation. Such passbands include the primary colors of the spectrum which usually correspond to passbands centered at about 450 nm, 530 nm and 650 nm. Such passbands were selected because many lenses are designed to control the primary colors of the spectrum. A second reason for selecting these passbands is that most detectors, including the human eye, have optimal sensitivity to the primary colors of the spectrum. Accordingly, optical filter 10 can enhance image formation when used with such components.

Figure 2:
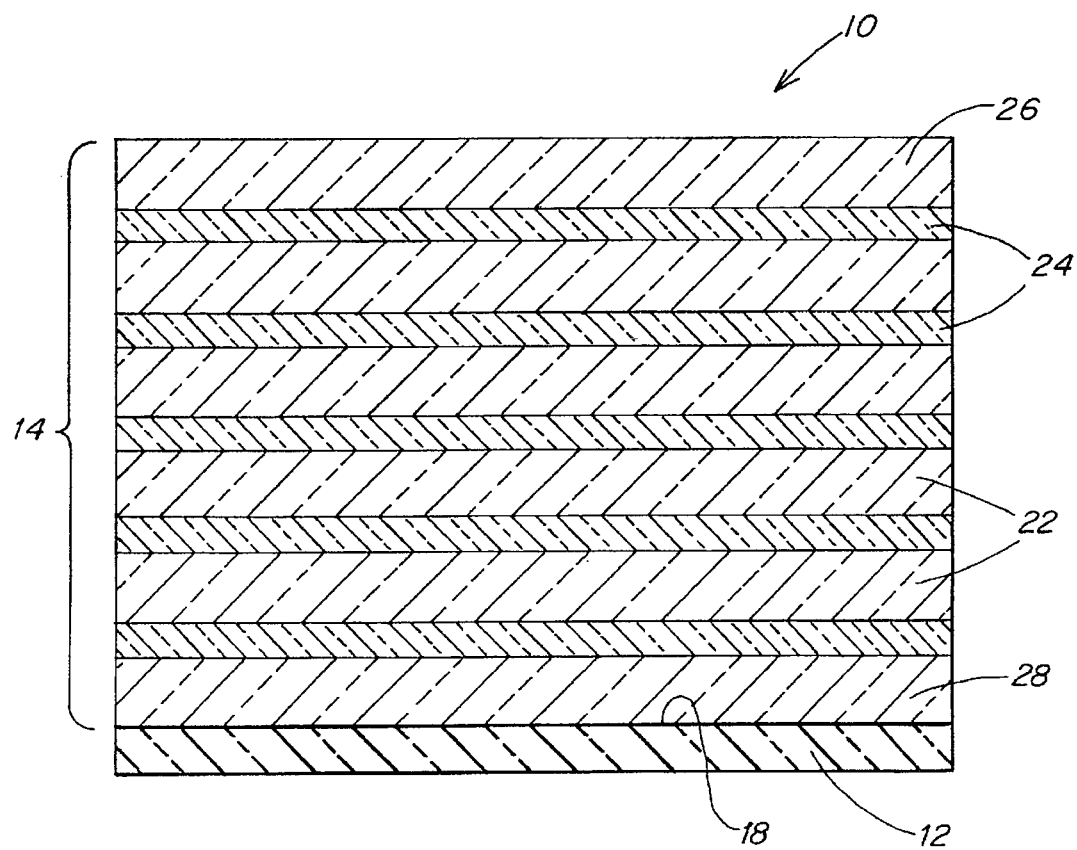
FIG. 2 is a cross-sectional view of one embodiment of the optical filter of FIG. 1.

FIG. 2 shows an embodiment of FIG. 1 of the present invention in which multilayer coating 14 includes an alternating stack of layers of a first transmissive material 22 which has a high refractive index and a second transmissive material 24 which has a low refractive index. "Transmissive material" as used herein refers to any solid material which is nonabsorptive and transparent in the visible region of the electromagnetic spectrum. "High refractive index" as used herein denotes a refractive index of from 1.8 to 2.7, more preferably from 2 to 2.5 and most preferably from 2.15 to 2.35. An exemplary and nonlimiting list of high refractive index material compositions which may be used includes ZnS, $TiO_2$, $Ta_2O_5$, $HfO_2$, $Ln_2O_3$, $ZrO_2$, $Bi_2O_3$, CdS, ZnSe, $Sb_2O_3$ and mixtures thereof. A "low refractive index" as used herein refers to a refractive index of from 1.2 to 1.8, more preferably from 1.3 to 1.7 and most preferably 1.4 to 1.6. Compositions of materials appropriate for use as low refractive index materials include, but are not limited to, $3NaFAlF_3$, $CaF$, $SiO_2$, $MgF_2$, $NdF_3$, $ThF_4$, $HfF_4$ and mixtures thereof.

Material 22 may be chosen from any transmissive, high refractive index material, and material 24 may be selected from any transmissive, low refractive index material so long as optical filter 10 provides an enhanced image. However, as the difference in the refractive indices of materials 22 and 24 decreases, the number of layers of materials 22 and 24 of which multilayer coating 14 is comprised usually increases.

Although shown in FIG. 2 as having 11 total layers, multilayer coating 14 may comprise any number of total layers of transmissive materials so long as optical filter 10 provides an enhanced image. Preferably, to produce the enhanced image desired, multilayer coating 14 includes from 6 to 13 total layers. However, in certain embodiments, the total number of layers may be more or less. The number of layers of materials 22 and 24 of which coating 14 is comprised depends upon the system in which optical filter 10 is used.

The optical thickness of the layers of material 22 and the optical thickness of the layers of material 24 may be any which result in optical filter 10 yielding an enhanced image. "Optical thickness" herein refers to the product of the physical thickness of a material and the refractive index of the material. Typically, the optical thicknesses of material 22 is between 1000 nm and 1500 nm, and the optical thickness of material 24 is between 100 nm and 700 nm. Preferably, the ratio of the optical thickness of material 22 to the optical thickness of material 24 is at least two to one and can be as much as nine to one or more. For example, first transmissive material 22 may have an optical thickness of about 1255 nm and second transmissive material 24 may have an optical thickness of about 179 nm. Alternatively, first transmissive material 22 may have an optical thickness of about 1070 nm and second transmissive material 24 may have an optical thickness of about 134 nm.

Furthermore, to produce an enhanced image, the total phase thickness of the combination of a layer of material 24 and a layer of material 22 preferably is in the range of from about 720° to about 900°. "Phase thickness" as used herein refers to the thickness of a material in terms of the wavelength of electromagnetic radiation, where 360° is one wavelength. For example, a phase thickness of 900° is the equivalent of 10 quarter wavelengths.

According to the present invention, the optical thicknesses of all the layers of material 22 or all the layers of material 24 need not be the same, so long as optical filter 10 provides an enhanced image. Thus, for example, in one embodiment, first transmissive multilayer coating 14 includes layers of materials 22 and 24, wherein layers of first transmissive material 22 vary in optical thickness. In another embodiment, coating 14 comprises layers of materials 22 and 24, wherein layers of second transmissive material 24 vary in optical thickness. In yet another embodiment, coating 14 includes layers of material 22 which vary in optical thickness and layers of material 24 which vary in optical thickness.

As shown in FIG. 2, top layer 26 and bottom layer 28 comprise first transmissive material 22. However, other combinations of layers of materials 22 and 24 may be used to provide multilayer coating 14 of optical filter 10 so long as the transmitted signal results in an enhanced image. For example, in one embodiment, top layer 26 and bottom layer 28 comprise second transmissive material 24. In another embodiment, top layer 26 comprises first trammissive material 22 and bottom layer 28 comprises second transmissive material 24. In yet another embodiment, top layer 26 comprises second transmissive material 24 and bottom layer 28 comprises first transmissive material 22.

Multilayer coating 14 may comprise consecutive layers of materials 22 or 24, so long as optical filter 10 provides an enhanced image. Thus, in an embodiment shown in FIG. 3, multilayer coating 14 comprises layers of first transmissive material 22 and second transmissive material 24, wherein some layers of material 22 are stacked consecutively and some layers of material 22 are stacked in layers with material 24. However, it is to be appreciated that other combinations of intercalating layers of material 22 and material 24 are also in accordance with the present invention. For example, at least one portion of multilayer coating 14 may comprise consecutive layers of second transmissive material 24 while other portions of multilayer coating 14 may include alternating layers of materials 22 and 24. Alternatively, multilayer coating 14 may comprise at least one portion having consecutive layers of first transmissive material 22, at least one portion having consecutive layers of second transmissive material 24 and the remaining portions having alternating layers of materials 22 and 24.

Although FIGS. 2 and 3 include only two different transmissive materials, multilayer coating 14 may comprise more than two different transmissive materials so long as optical filter 10 provides an enhanced image. Thus, for example, multilayer coating may include more than one low refractive index transmissive material, more than one high refractive index transmissive material, or more than one low refractive index material and more that one high refractive index material.

The following examples of the present invention illustrate acceptable combinations of materials 22 and 24 which form coating 14 and which produce an enhanced image. These examples are illustrative only and are not intended to be limiting.

EXAMPLE I

Figure 6:
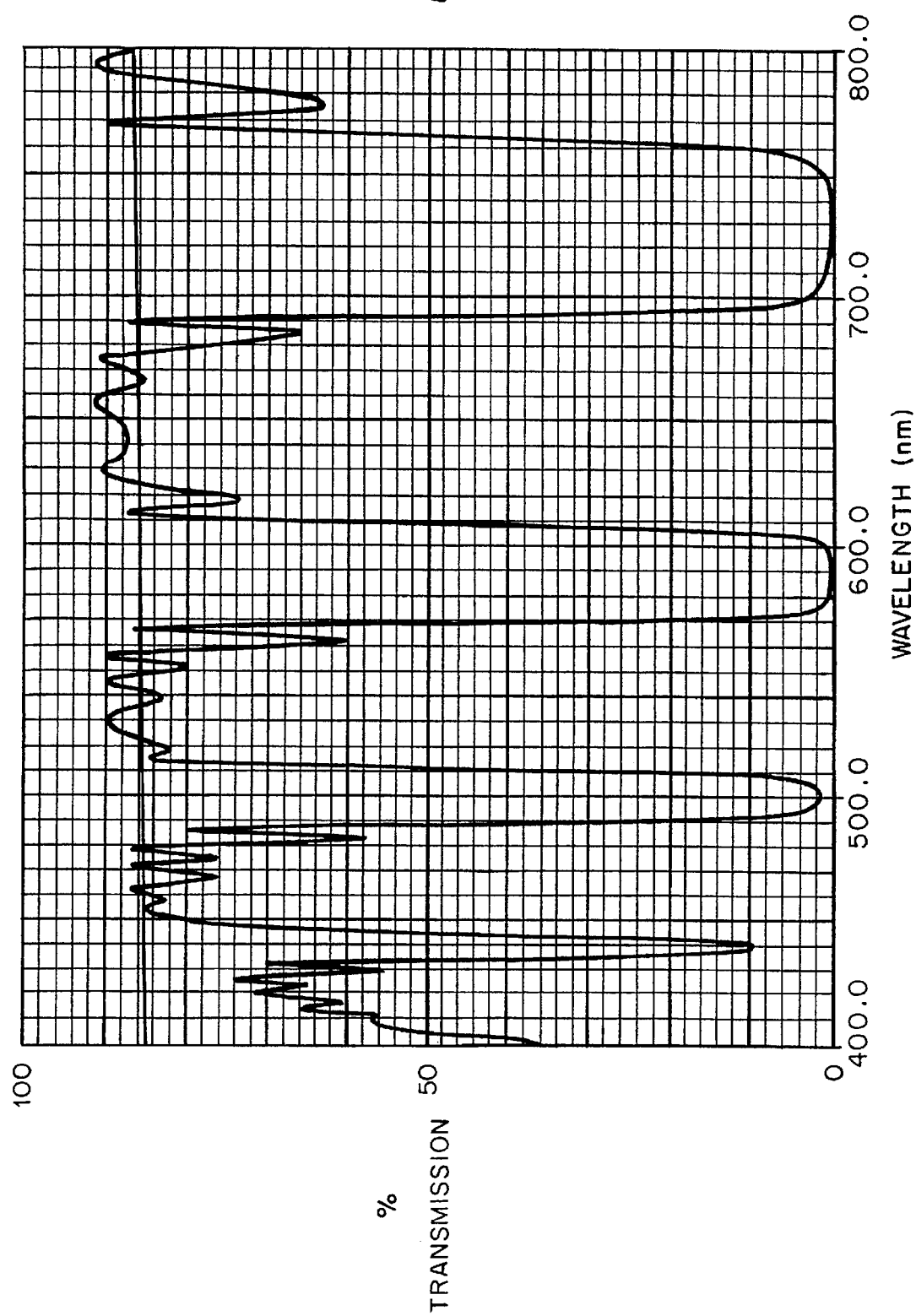
FIG. 6 is a spectrum of the transmission of electromagnetic radiation as a function of wave length for the optical filter of Example 1.

An optical filter according to the present invention is arranged as shown in Table I. This optical filter is often utilized in general electro-optical systems. The corresponding spectrum of electromagnetic radiation transmitted by the filter as a function of wavelength is shown in FIG. 6.

TABLE 1

| Layer # | Material | Refractive Index | Optical Thickness (nm) | Phase Thickness |
| --- | --- | --- | --- | --- |
| Substrate | soda lime | 1.51 | 1500 | |
| 1 | ZnS | 2.35 | 1255 | 630° |
| 2 | 3NaFAlF$_3$ | 1.35 | 179 | 90° |
| 3 | ZnS | 2.35 | 1255 | 630° |
| 4 | 3NaFAlF$_3$ | 1.35 | 179 | 90° |
| 5 | ZnS | 2.35 | 1255 | 630° |
| 6 | 3NaFAlF$_3$ | 1.35 | 179 | 90° |
| 7 | ZnS | 2.35 | 1255 | 630 |
| 8 | 3NaFAlF$_3$ | 1.35 | 179 | 90° |
| 9 | ZnS | 2.35 | 1255 | 630° |
| 10 | 3NaFAlF$_3$ | 1.35 | 179 | 90° |
| 11 | ZnS | 2.35 | 1255 | 630° |
| 12 | 3NaFAlF$_3$ | 1.35 | 179 | 90° |
| 13 | ZnS | 2.35 | 1255 | 630° |

EXAMPLE II

Figure 7:
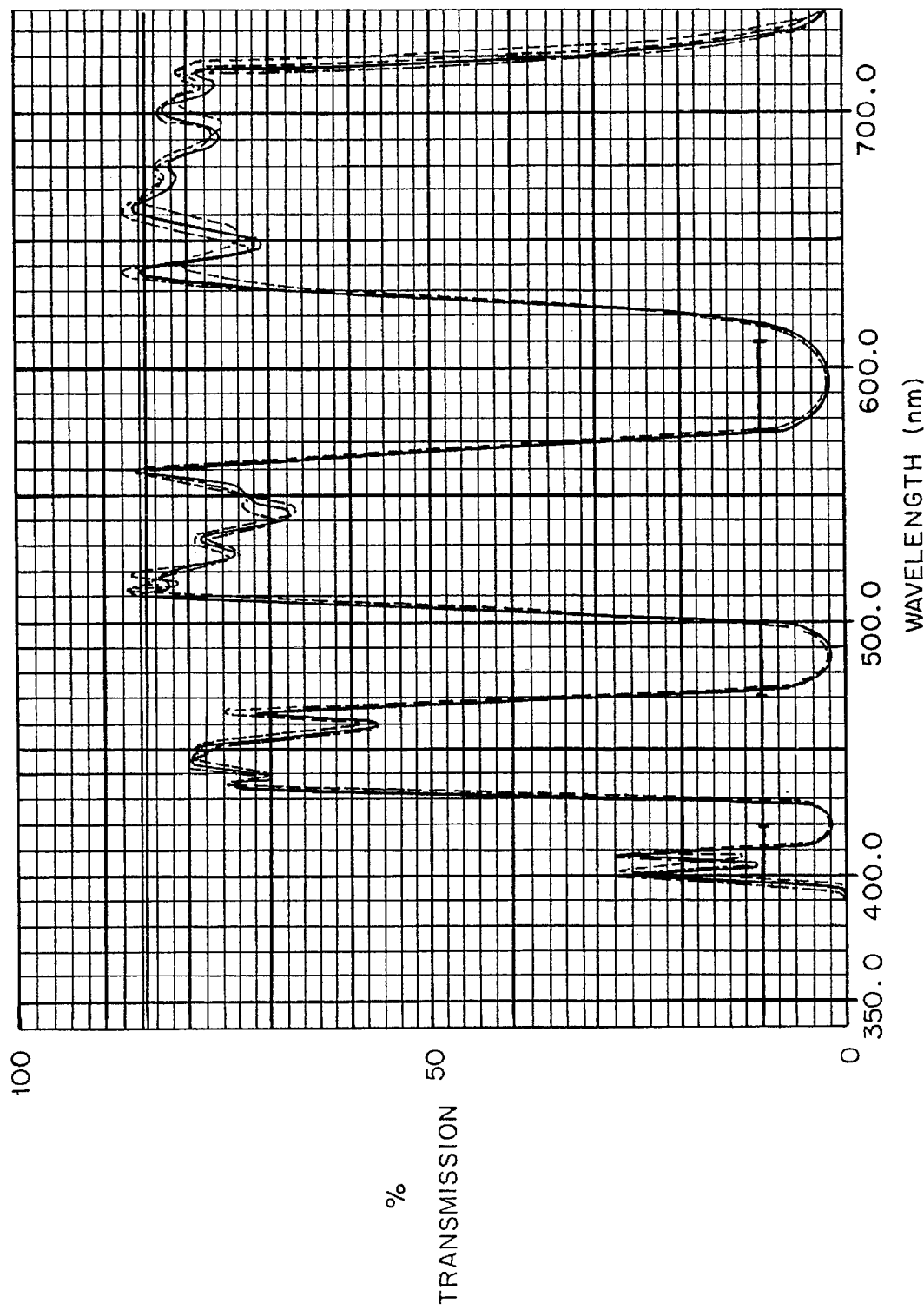
FIG. 7 is a spectrum of the transmission of electromagnetic radiation as a function of wave length for the optical filter of Example 2.

An optical filter according to the present invention is arranged as shown in Table 2. Usually, this filter is used for systems with a silicon based detector which is sensitive well into the infrared region of the electromagnetic spectrum (e.g., a video camera with a CCD). The corresponding spectrum of electromagnetic radiation transmitted by the optical filter as a function of wavelength is shown in FIG. 7.

TABLE 2

| Layer # | Material | Refractive Index | Optical Thickness (nm) | Phase Thickness |
| --- | --- | --- | --- | --- |
| Substrate | BK7 glass | 1.51 | 2000 | |
| 1 | TiO$_2$ | 2.25 | 1070 | 720° |
| 2 | SiO$_2$ | 1.45 | 133.75 | 90° |
| 3 | TiO$_2$ | 2.25 | 1070 | 720° |
| 4 | SiO$_2$ | 1.45 | 133.75 | 90° |
| 5 | TiO$_2$ | 2.25 | 1070 | 720° |
| 6 | SiO$_2$ | 1.45 | 133.75 | 90° |
| 7 | TiO$_2$ | 2.25 | 1070 | 720° |
| 8 | SiO$_2$ | 1.45 | 133.75 | 90° |
| 9 | TiO$_2$ | 2.25 | 1070 | 720° |

EXAMPLE III

Figure 8:
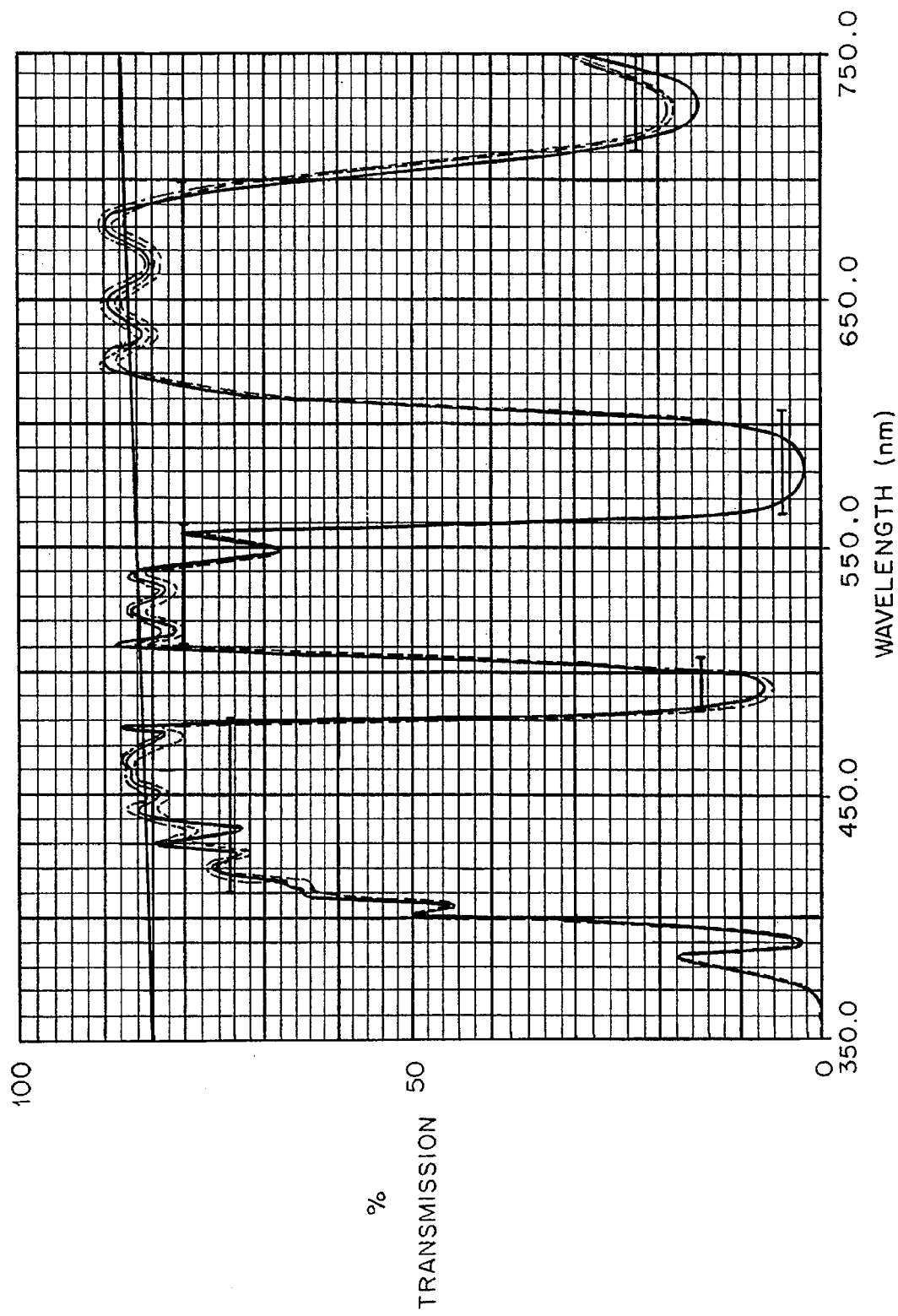
FIG. 8 is a spectrum of the transmission of electromagnetic radiation as a function of wave length for the optical filter of Example 3.

An optical filter according to the present invention is arranged as shown in Table 3. Typically, this filter is used in systems in which the detector comprises photographic film or the human eye. The corresponding spectrum of electromagnetic radiation transmitted by the optical filter as a function of wavelength is shown in FIG. 8.

TABLE 3

| Layer # | Material | Refractive Index | Optical Thickness (nm) | Phase Thickness |
| --- | --- | --- | --- | --- |
| Substrate | Lexan | 1.48 | 1500 | |
| 1 | ZnS | 2.35 | 1023.75 | 630° |
| 2 | 3NaFAlF$_3$ | 1.35 | 438.75 | 270° |
| 3 | ZnS | 2.35 | 1023.75 | 630° |
| 4 | 3NaFAlF$_3$ | 1.35 | 438.75 | 270° |
| 5 | ZnS | 2.35 | 1023.75 | 630° |
| 6 | 3NaFAlF$_3$ | 1.35 | 438.75 | 270° |
| 7 | ZnS | 2.35 | 1023.75 | 630° |
| 8 | 3NaFAlF$_3$ | 1.35 | 438.75 | 270° |
| 9 | ZnS | 2.35 | 1023.75 | 630° |
| 10 | 3NaFAlF$_3$ | 1.35 | 672.75 | 270° |
| 11 | ZnS | 2.35 | 1082.25 | 630° |

For all embodiments, substrate 12 should comprise a substantially transparent material having a refractive index between 1.45 and 1.60 and an optical thickness between 0.5 mm and 10 mm. Typically, substrate 12 has an optical thickness of 1 mm to 2 mm. "Substantially transparent" as used herein means any material which is capable of transmitting about 85% to 95% of desirable light for forming an enhanced image. Substantially transparent materials appropriate for use as substrate 12 include, but are not limited to, borosilicates, soda lime and glasses, including sharpcut glasses manufactured by Schott glass such as BK7. Certain plastics may also be used such as polycarbonates including Lexan, which is a trademark of E. I. dupont, Wilmington, Del. Mixtures of these materials may also be used. Often substrate 12 comprises BK7 glass.

In some applications, such as when optical filter 10 is incorporated into sunglasses, it may be desirable that substrate 12 absorb certain wavelengths of visible light. In these cases, substrate 12 may include one or more additives. A nonlimiting, illustrative list of additives appropriate for use in the present invention includes absorbing dyes, colloidal suspensions, and neutral absorbers. Thus, for example, when optical filter 10 is used in sunglasses, carbon black may be added to a substantially transparent material to make substrate 12. In other uses, such as when optical filter 10 is incorporated into goggles or glasses to be used in hazy conditions, substrate 12 may include an additive that makes substrate 12 appear yellow or straw in color.

In certain applications, multilayer coating 14 includes a combination of transmissive materials which are selected by considering certain desired physical properties of optical filter 10 in addition to its filtering ability. For example if it is desirable that optical filter 10 be relatively soft, zinc sulfide and cryolite (e.g., $Na_3AlF_6$) may be the first and second transmissive materials 22 and 24, respectively. If it is desirable that optical filter 10 be hard, multilayer coating 14 may comprise combinations of titanium dioxide and silicon dioxide or tantalum pentoxide and silicon dioxide. According to the present invention, any combination of transmissive materials capable of achieving such desired physical properties may be used so long as optical filter 10 provides an enhanced image.

Although shown as a flat, smooth surface in FIGS. 1–4, top surface 18 of substrate 12 may be any shape including concave, convex or rippled so long as surface 18 contains no discontinuities. A "discontinuity" as used herein refers to a section of surface 18 at which the level of surface 18 changes abruptly resulting in a substantial shadow being formed by a vapor stream coating surface 18.

For some uses such as, for example, broad base detectors, it may be desirable that optical filter 10 comprise two substrates. FIG. 4 depicts an embodiment of the present invention in which optical filter 10 comprises substrate 12, multilayer coating 14 and second substrate 16. The function of second substrate 16 is to prevent any damage to multilayer coating 14 such as, for example, scraping or gouging. Typically, second substrate 16 has similar properties to substrate 12 as described above. Second substrate 16 may include any of the aforementioned materials which may be used for substrate 12.

In many applications, the slope of optical filter 10 may be used as a measure of the quality of image enhancement achieved. The "slope" of optical filter 10 is defined by the following equation:

$$slope = \frac{\lambda(80\% \text{ transmission}) - \lambda(95\% \text{ reflection})}{\lambda(50\% \text{ transmission})}$$

The slope of optical filter 10 should be from 0.1% to 5%, more preferably 1% to 5% and most preferably from 2% to 4%.

Optical systems which employ optical filters in accordance with the present invention may be any in which it is desirable to achieve an enhanced image. FIG. 5 shows an optical system 60 which includes a source of electromagnetic radiation 62 and a detector 64 between which optical filter 10 is placed. Source 62 may comprise any source of electromagnetic radiation including incandescent lamps, fluorescent lamps, atomic emission lamps and sunlight. Detector 64 may comprise any detector such as the human eye, photographic film, a camera, a high definition camera, a vidicon, a CCD or an SID.

In optical system 60, source 62 emits radiation 66 which includes wavelengths of undesirable light. Radiation 66 impinges upon filter 10 which substantially blocks the wavelengths of undesirable light and transmits desirable wavelengths of light 68 which impinge upon detector 64. While FIG. 5 depicts an optical system in which filter 10 is placed between source 62 and detector 64, it is to be appreciated that filter 10 may be placed anywhere within optical system 60 such that an enhanced image is formed. For example, if optical system 60 includes reflective optics such as one or more mirrors, optical filter 10 may be behind source 62 or detector 64. In addition, optical system 60 may include collimation devices to collimate radiation 66, light 68 or both. Furthermore, it is to be understood that the present invention comprises systems which may include any combination, arrangement or number of sources, detectors and optical filters and other standard optical devices so long as an enhanced image is formed by the filtering of radiation by optical filter 10. Accordingly, detector 64 may be the human eye or nonhuman detectors which may be used for detecting light. An illustrative and nonlimiting list of such detectors includes high definition cameras, film, remote monitoring using cameras, vidicons, CCD's and SID's.

Optical filters in accordance with the present invention may be manufactured using vapor deposition techniques which are known to those skilled in the art. Such techniques include, but are not limited to, those disclosed in *Coatings on Glass*, by H. K. Pulker, G. Siddall, Ed., Elsevier: Amsterdam, 1984. These techniques include physical vapor deposition (PVD) and chemical vapor deposition (CVD). Typically, PVD includes: generation of vapors by evaporation, sublimation or sputtering; transport of the vaporized material to a substrate; and condensation of the vaporized material on the substrate. Usually, CVD is similar to PVD except that at least one chemical reaction occurs during the deposition process. Sol gel techniques may also be used to produce optical filter 10. A sol gel method often includes deposition of a solution containing a solvent and a solute. The solvent is subsequently removed by, for example, evaporation to leave a layer of the solute. It is to be appreciated that, while some techniques for producing optical filter 10 have been listed here, all methods of layering materials in accordance with the present invention can be used to form optical filter 10.

Having thus described certain embodiments of the present invention, various alterations, modifications and improvements will readily occur to those skilled in the art. Such alterations, modifications and improvements are intended to be within the spirit and scope of the invention. The materials employed, as well as their shapes and dimensions, may be any required. Accordingly, the foregoing description is by way of example only and is not intended as limiting. The invention is limited only as defined in the following claims and equivalents thereto.

What is claimed is:

1. An optical filter, comprising:
   a substrate including a substantially transparent material, the substrate having a first surface; and
   a multilayer coating disposed on the first surface of the substrate, the multilayer coating including first layers of a first transmissive material having a high index of refraction and second layers of a second transmissive material having a low index of refraction, wherein the first layers have an optical thickness greater than the optical thickness of the second layers, said optical filter blocking passbands substantially centered at 490 nm and 590 nm.

2. The optical filter according to claim 1, wherein the ratio of the optical thickness of the first layers to the optical thickness of the second layers is greater than two to one.

3. The optical filter according to claim 1, wherein the ratio of the optical thickness of the first layers to the optical thickness of the second layers is in the range of from about two to one to about nine to one.

4. The optical filter according to claim 1, wherein the first transmissive material is selected from the group consisting of ZnS, $TiO_2$, $Ta_2O_5$ and mixtures thereof.

5. The optical filter according to claim 1, wherein the second transmissive material is selected from the group consisting of $Na_3AlF_6$, $SiO_2$ and mixtures thereof.

6. The optical filter according to claim 1, wherein the total number of first and second layers does not exceed 13.

7. The optical filter according to claim 1, wherein the optical filter has a slope of at most 5%.

8. The optical filter according to claim 1, wherein the total phase thickness of the combination of one first layer and one second layer is in the range of from about 720° to about 900°.

9. An optical filter, comprising:

a substrate including a substantially transparent material, the substrate having a first surface;

layers of a first transmissive material having a high refractive index; and layers of a second transmissive material having a low refractive index adjacently intercalated with the layers of the first transmissive material, said layers of the second transmissive material having an optical thickness at most one half the optical thickness of said layers of the first transmissive material, said optical filter blocking electromagnetic radiation passbands having wavelengths substantially centered at 490 nm and 590 nm.

10. The optical filter according to claim 9, wherein the substrate has an optical thickness from 1 mm to 2 mm.

11. The optical filter according to claim 9, wherein the substantially transparent material has a refractive index from 1.45 to 1.60.

12. The optical filter according to claim 9, wherein the substrate further comprises an additive selected from the group consisting of absorbing dyes, neutral absorbers and colloidal suspensions.

13. The optical filter according to claim 9, wherein the multilayer coating includes at least one portion having consecutively stacked layers of the first transmissive material.

14. The optical filter according to claim 9, wherein the multilayer coating includes at least one portion having consecutively stacked layers of the second transmissive material.

15. The optical filter according to claim 9, wherein the multilayer coating includes at least one portion having consecutively stacked layers of the first transmissive material and at least one portion having consecutively stacked layers of the second transmissive material.

16. The optical filter according to claim 9, wherein the optical filter has a slope of at most 5%.

17. An optical filter, comprising:

a substrate including a substantially transparent material, the substrate having a first surface;

layers of a first transmissive material having a high refractive index;

layers of a second transmissive material having a low refractive index; and a first layer selected from the group consisting of the layers the first transmissive material and the layers of the second transmissive material, the first layer being disposed on the first surface of the substrate, wherein the layers the of the first transmissive material and the layers of the second transmissive material are adjacently and alternately stacked so that the optical filter blocks wavelengths of less than 410 nm and greater than 700 nm, and blocks passbands substantially centered at 490 nm and 590 nm.

18. A system, comprising:

a source capable of emitting electromagnetic radiation;

an optical filter disposed so that the electromagnetic radiation emitted by the source impinges upon the optical filter, the optical filter comprising:

a substrate including a substantially transparent material, the substrate having a first surface; and a multilayer coating disposed on the first surface of the substrate, the multilayer coating including layers of a first transmissive material having a high index of refraction and layers of a second transmissive material having a low index of refraction, wherein the layers of the first transmissive material have an optical thickness more than twice an optical thickness of the layers of the second transmissive material, the layers of the first and second transmissive material being selected and arranged so that the optical fiber blocks wavelengths less than 410 nm and greater than 700 nm, and blocks passbands substantially centered at 490 nm and 590 nm; and a detector disposed so that the wavelengths of desirable light transmitted by the optical filter impinge upon the detector, wherein an enhanced image is detected.

19. The system according to claim 18, wherein the detector comprises a nonhuman detector.

20. The optical filter according to claim 1, wherein said optical filter further blocks substantially all radiation having wavelengths less than 410 nm and greater than 700 nm.

21. The optical filter according to claim 9, wherein the optical filter further blocks substantially all radiation having wavelengths less than 410 nm and greater than 700 nm.

* * * * *